United States Patent
Edge et al.

(10) Patent No.: US 8,467,806 B2
(45) Date of Patent: Jun. 18, 2013

(54) METHOD AND APPARATUS FOR SUPPORTING LOCATION SERVICES WITH A STREAMLINED LOCATION SERVICE LAYER

(75) Inventors: Stephen W. Edge, Escondido, CA (US); Andreas K. Wachter, Herrsching am Ammersee (DE)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 12/793,587

(22) Filed: Jun. 3, 2010

(65) Prior Publication Data

US 2010/0311438 A1 Dec. 9, 2010

Related U.S. Application Data

(60) Provisional application No. 61/184,706, filed on Jun. 5, 2009, provisional application No. 61/185,940, filed on Jun. 10, 2009.

(51) Int. Cl.
*H04W 24/00* (2009.01)

(52) U.S. Cl.
USPC .............. 455/456.1; 455/456.2; 455/456.6

(58) Field of Classification Search
None
See application file for complete search history.

(56) References Cited

U.S. PATENT DOCUMENTS

| | | | |
|---|---|---|---|
| 2006/0258371 A1* | 11/2006 | Krishnamurthi et al. | 455/456.1 |
| 2007/0037585 A1* | 2/2007 | Shim | 455/456.1 |
| 2007/0149213 A1 | 6/2007 | Lamba et al. | |
| 2009/0054035 A1* | 2/2009 | Kim et al. | 455/411 |
| 2010/0062752 A1* | 3/2010 | Shim | 455/418 |

FOREIGN PATENT DOCUMENTS

| JP | 2008547263 A | 12/2008 |
|---|---|---|
| WO | 2007018409 | 2/2007 |

OTHER PUBLICATIONS

OMA-TS-UPL-V2_0-20060727-D, Open Mobile Alliance, UserPlane Location Protocol, Draft Version 2.0, Jul. 27, 2006.
International Search Report and Written Opinion—PCT/US2010/037497, International Search Authority—European Patent Office—Nov. 22, 2010.

\* cited by examiner

*Primary Examiner* — Erika A Washington
(74) *Attorney, Agent, or Firm* — Arnold J. Gum

(57) ABSTRACT

Techniques for supporting location services with a streamlined location service layer are described. In one design, a terminal may receive a location service request from an application that is internal or external to the terminal. The terminal may exchange at least one message with a location server to establish an extended location session of a particular duration via the streamlined location service layer. The terminal can thereafter obtain location service from the location server at any time within the particular duration of the extended location session, e.g., whenever a location request is received from the application. The terminal may obtain location service any number of times and at any time during the extended location session. The terminal or application may emulate a more complex location service based on location information received from all of the times in which location service is obtained by the terminal.

38 Claims, 6 Drawing Sheets

METHOD AND APPARATUS FOR SUPPORTING LOCATION SERVICES WITH A STREAMLINED LOCATION SERVICE LAYER

I. CLAIM OF PRIORITY UNDER 35 U.S.C. §119

The present Application for Patent claims priority to Provisional U.S. Application Ser. No. 61/184,706, entitled "Streamlined SUPL Service Layer," filed Jun. 5, 2009, and Provisional U.S. Application Ser. No. 61/185,940, entitled "Streamlined SUPL Service Layer," filed Jun. 10, 2009, both assigned to the assignee hereof and expressly incorporated herein by reference.

BACKGROUND

I. Field

The present disclosure relates generally to communication, and more specifically to techniques for supporting location services.

II. Background

It is often desirable, and sometimes necessary, to know the location of a terminal, e.g., a cellular phone. The terms "location" and "position" are synonymous and are used interchangeably herein. For example, a location services (LCS) client may desire to know the location of the terminal. The terminal may then communicate with a location server to obtain a location estimate for the terminal. The terminal or the location server may then return the location estimate to the LCS client.

A message flow (which may also be referred to as a call flow or a procedure) may be executed whenever the LCS client desires to know the location of the terminal. Various messages may be exchanged between the terminal and the location server via one or more network entities for the message flow. These messages may ensure that each entity is provided with pertinent information in order to support positioning of the terminal. However, these messages add to the traffic at various entities.

The LCS client may desire to know the location of the terminal whenever certain conditions are triggered. The location server may be tasked with performing various functions to detect for trigger conditions and to send a location estimate to the LCS client whenever a triggered condition is detected. However, these functions may complicate the design and operation of the location server, especially if the location server is required to perform these functions for a large number of terminals. Alternatively, the terminal may be tasked with performing various functions to detect for trigger conditions and to send a location estimate to the LCS client whenever a triggered condition is detected. In this case, it would be desirable for the terminal to be able to efficiently communicate with the location server when and as required.

SUMMARY

Techniques for supporting location services with a streamlined location service layer are described herein. The streamlined location service layer may allow a terminal to establish and maintain an extended location session with a location server. An application may then be able to efficiently obtain location service from the terminal and the location server at any time during the extended location session, since some or all of the signaling and processing overhead may have occurred when the extended location session was established and may not need to be repeated. The streamlined location service layer may also allow the terminal to control parameters (e.g., to select a positioning method) to use during the extended location session.

In one design, a terminal may receive a location service request from an application, which may be internal or external to the terminal. The terminal may exchange at least one message with a location server to establish an extended location session of a particular duration. The terminal can thereafter obtain location service from the location server at any time within the particular duration of the extended location session, e.g., whenever a location request is received from the application. In one design, the terminal may send a first message comprising a request for assistance data or for a location estimate to the location server. The terminal may then receive a second message comprising the requested assistance data or location estimate for the terminal from the location server.

The terminal may obtain location service any number of times and at any time during the extended location session. The terminal or application may emulate a more complex location service (e.g., a periodic trigger location service or an area event trigger location service) based on location information received from all of the times in which location service is obtained by the terminal.

Various aspects and features of the disclosure are described in further detail below.

DETAILED DESCRIPTION

The techniques described herein may be used for user plane and control plane location solutions/architectures. A user plane location solution is a location solution that sends messages for location services via a user plane. A user plane is a mechanism for carrying signaling and data for higher-layer applications and employing a user-plane bearer, which is typically implemented with standard protocols such as User Datagram Protocol (UDP), Transmission Control Protocol (TCP), and Internet Protocol (IP). A control plane location solution is a location solution that sends messages for location services via a control plane. A control plane is a mechanism for carrying signaling for higher-layer applications and is typically implemented with network-specific protocols, interfaces, and signaling messages. Messages supporting location services are carried as part of signaling in a control plane location solution and as part of data (from the network perspective) in a user plane location solution. The content of the messages may, however, be the same or similar in both user plane and control plane location solutions.

For clarity, certain aspects of the techniques are described below for Secure User Plane Location (SUPL) from Open Mobile Alliance (OMA). SUPL is applicable for various wireless and wireline networks and is described in publicly available documents from OMA. For clarity, SUPL terminology is used in much of the description below.

Figure 1:
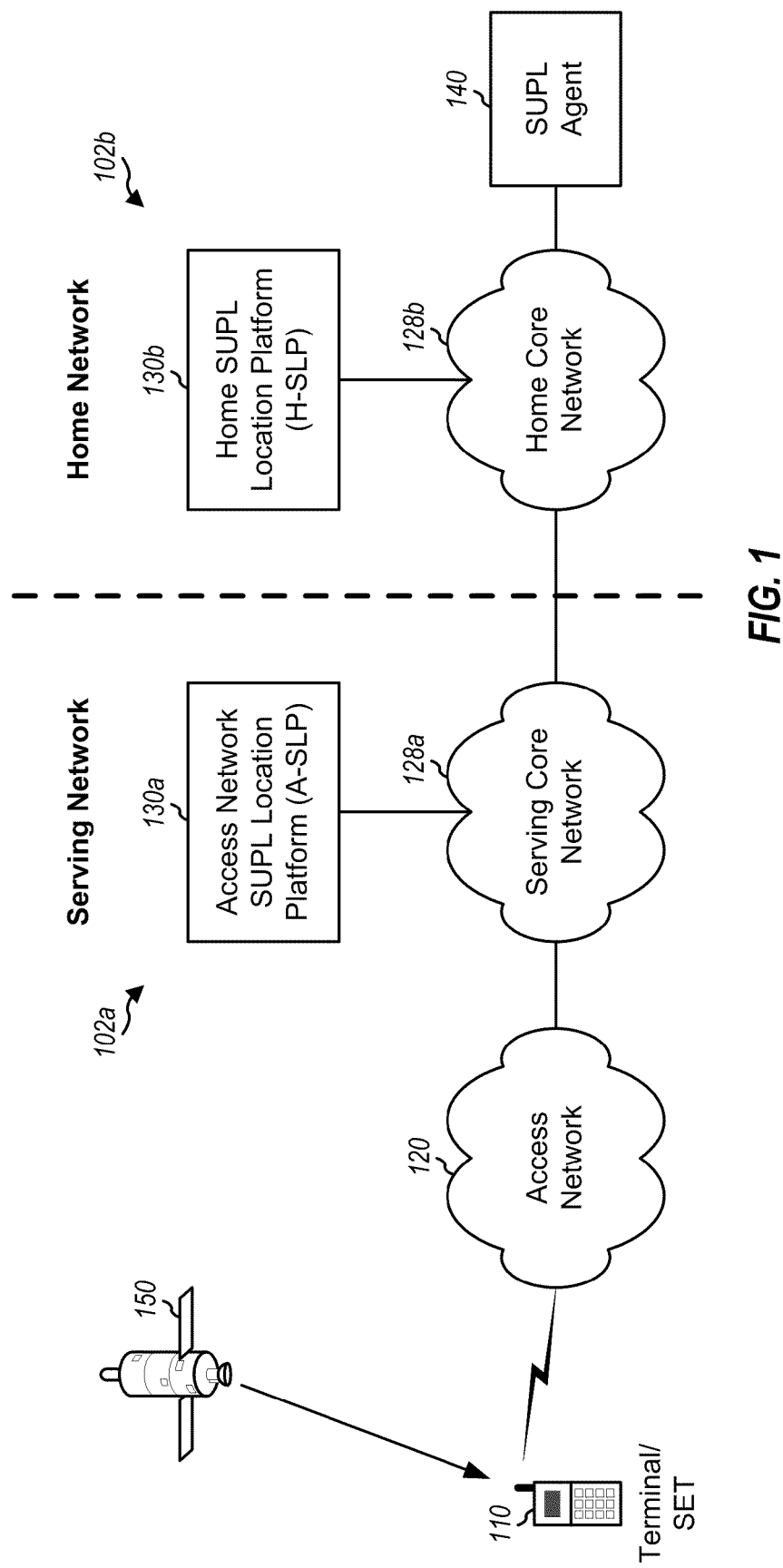
FIG. 1 shows an exemplary network deployment.

FIG. 1 shows an exemplary network deployment supporting location services. A terminal 110 may have service subscription with a home network 102b. However, terminal 110 may be roaming to a serving network 102a, which may also be referred to as a visited network. Terminal 110 may then communicate with serving network 102a to obtain communication services. In general, terminal 110 may be stationary or mobile and may also be referred to as a mobile station (MS), a user equipment (UE), an access terminal (AT), a subscriber station, a station, etc. Terminal 110 may be a cellular phone, a personal digital assistant (PDA), a handheld device, a wireless device, a laptop computer, a wireless modem, a cordless phone, a telemetry device, a tracking device, etc. Terminal 110 may be referred to as a SUPL Enabled Terminal (SET) in SUPL. The terms "terminal" and "SET" are used interchangeably herein.

Serving network 102a may include an access network 120, a serving core network 128a, an Access Network SUPL Location Platform (A-SLP) 130a, and other network entities not shown in FIG. 1 for simplicity. Access network 120 may be a radio access network (RAN) (as shown in FIG. 1) or a wireline access network. A RAN may be a Code Division Multiple Access (CDMA) 1X network, a Wideband CDMA (WCDMA) network, a Global System for Mobile Communications (GSM) network, a Long Term Evolution (LTE) network, a wireless local area network (WLAN), etc. Core network 128a may include network entities that may support various communication services for terminals communicating with serving network 102a. A-SLP 130a may support location services for terminals communicating with serving network 102a (e.g., including terminals roaming to serving network 102a) and may or may not require the terminals to have any service subscription or any prior relationship to A-SLP 130a. Core network 128a may also include a Visited SLP (V-SLP) that may support location services for terminals roaming to serving network 102a.

Home network 102b may include a home core network 128b, a home SUPL Location Platform (H-SLP) 130b, and other network entities not shown in FIG. 1 for simplicity. Core network 128b may include network entities that may support various communication services for terminals communicating with or belonging to home network 102b. H-SLP 130b may support location services for terminals having service subscription with home network 102b.

A-SLP 130a and H-SLP 130b may support location services for terminals/SETs. Location services may include any services based on or related to location. Location services may include positioning, which is a process to determine a geographic or civil location estimate for a target SET. A target SET is a SET for which location information is sought. A location estimate may also be referred to as a position estimate, a position fix, etc. Positioning may provide (i) latitude, longitude, and possibly altitude coordinates and an uncertainty for a geographic location estimate, (ii) a street address for a civil location estimate, and/or (iii) velocity and/or other information.

An SLP may include a SUPL Location Center (SLC) and a SUPL Positioning Center (SPC). The SLC may support location services, coordinate the operation of SUPL, and interact with SETs over user plane bearer. The SLC may perform functions for privacy, initiation, security, roaming support, charging/billing, service management, location calculation, etc. The SPC may support positioning for SETs and delivery of assistance data to the SETs and may also be responsible for messages and procedures used for location calculation. The SPC may perform functions for security, assistance data delivery, reference retrieval, location calculation, etc.

An SLP may support a proxy mode and/or a non-proxy mode in SUPL. In the proxy mode, a SET may communicate with an SLC in the SLP for location service, and the SLC would act as a proxy between the SET and an SPC in either the same SLP (for non-roaming) or a separate V-SLP (for roaming) In the non-proxy mode, a SET may communicate directly with the SPC for positioning after some initial communication with the SLC. In one proxy mode design, use of a V-SLP may be coordinated by H-SLP 130b and may not be visible to SET 110, which may interact only with H-SLP 130b. In one non-proxy mode design, SET 110 may interact directly with a V-SLP (e.g., with an SPC in the V-SLP) as directed by H-SLP 130b.

A SUPL agent 140 may be an LCS client and may communicate with H-SLP 130b (e.g., directly or via one or more networks) to obtain location information for target SETs. Location information may comprise a location estimate and/or any information related to location or velocity. A SET may also have a SUPL agent residing on the SET.

Terminal/SET 110 may receive and measure signals from satellites such as satellite(s) 150 to obtain pseudo-range measurements for the satellites. The satellites may be part of the United States Global Positioning System (GPS), the European Galileo system, the Russian GLONASS system, or some other satellite positioning system (SPS). The pseudo-range measurements and the known locations of the satellites may be used to derive a location estimate for terminal 110. Terminal 110 may also receive and measure signals from base stations within access network 120 and/or other networks in the same geographic area. Terminal 110 may obtain identity information, timing measurements, and/or signal strength measurements for these base stations. The identity information, timing measurements, and/or signal strength measurements and the known locations of the base stations may be used to derive a location estimate for terminal 110. In general, a location estimate may be derived based on identity information and measurements for satellites, base stations, pseudolites, and/or other transmitters.

Terminal/SET 110 may support one or more positioning methods. A positioning method may support positioning of a target terminal/SET based on measurements for one or more types of transmitters. For example, terminal/SET 110 may support autonomous GPS, assisted GPS (A-GPS), Advanced Forward Link Trilateration (A-FLT), Enhanced Observed Time Difference (E-OTD), Observed Time Difference Of Arrival (OTDOA), Enhanced Cell Identity (ID), Cell ID, some other positioning method, or a combination thereof Autonomous GPS and assisted GPS are positioning methods based on measurements for satellites, and the term "GPS" can generically refer to any GNSS. AFLT, E-OTD, and OTDOA are positioning methods based on timing measurements for base stations in a wireless network.

Terminal/SET 110 may also support one or more positioning protocols. A positioning protocol may define (i) procedures that may be executed by a target terminal/SET and a location server and (ii) communication or signaling between the target terminal/SET and the location server. For example, terminal/SET 110 may support Radio Resource LCS Protocol (RRLP), Radio Resource Control (RRC), LTE Positioning Protocol (LPP), C.S0022 (also known as IS-801), some other positioning protocol, or a combination thereof RRLP, RRC and LPP are defined by an organization named "3rd Generation Partnership Project" (3GPP). IS-801 is defined by an organization named "3rd Generation Partnership Project 2" (3GPP2).

SUPL Version 2.0 (SUPL 2.0) supports a set of predefined location services such as immediate location service, periodic trigger location service, area event trigger location service, etc. For the immediate location service, the location of a target SET may be determined immediately when requested and provided to a SUPL agent. For the periodic trigger location service, the location of a target SET may be periodically determined and provided to a SUPL agent. For the area event trigger location service, the location of a target SET may be determined periodically and provided to a SUPL agent when a trigger condition occurs, e.g., whenever the target SET is within a target area or enters or leaves the target area. Each of the predefined location services in SUPL 2.0 may be invoked by a SUPL agent with a single command. This may simplify the operation of the SUPL agent for more complex location services such as periodic trigger and area event trigger location services. The complexity is moved to an SLP and the target SET, which would keep track of state information for each invoked location service.

An application may emulate a complex location service (e.g., the periodic trigger location service) by keeping track of state information and invoking the immediate location service whenever required. Emulation may reduce complexity in the SLP and in the portion of the target SET that supports SUPL. However, emulation may be inefficient since more signaling overhead may be incurred for each invocation of the immediate location service.

In an aspect, a streamlined SUPL service layer may be used to provide applications with more efficient access to a SUPL positioning layer. The SUPL positioning layer may include protocol entities and functions that can support positioning of SETs. The SUPL service layer may support location services and may communicate with the SUPL positioning layer whenever positioning is required. In one design, the streamlined SUPL service layer may allow a SET to establish and maintain an extended location session with an SLP. An application (e.g., running on the SET) may invoke the SUPL service layer or the SUPL positioning layer at any time during the extended location session and may obtain a location estimate when and as needed during the extended location session. The streamlined SUPL service layer may also allow the SET to configure parameters (e.g., to select a positioning method, or a positioning protocol, or Quality of Positioning (QoP), etc.) to use during the extended location session (e.g., by taking into account the capabilities of the SET and the SLP).

Figure 2:
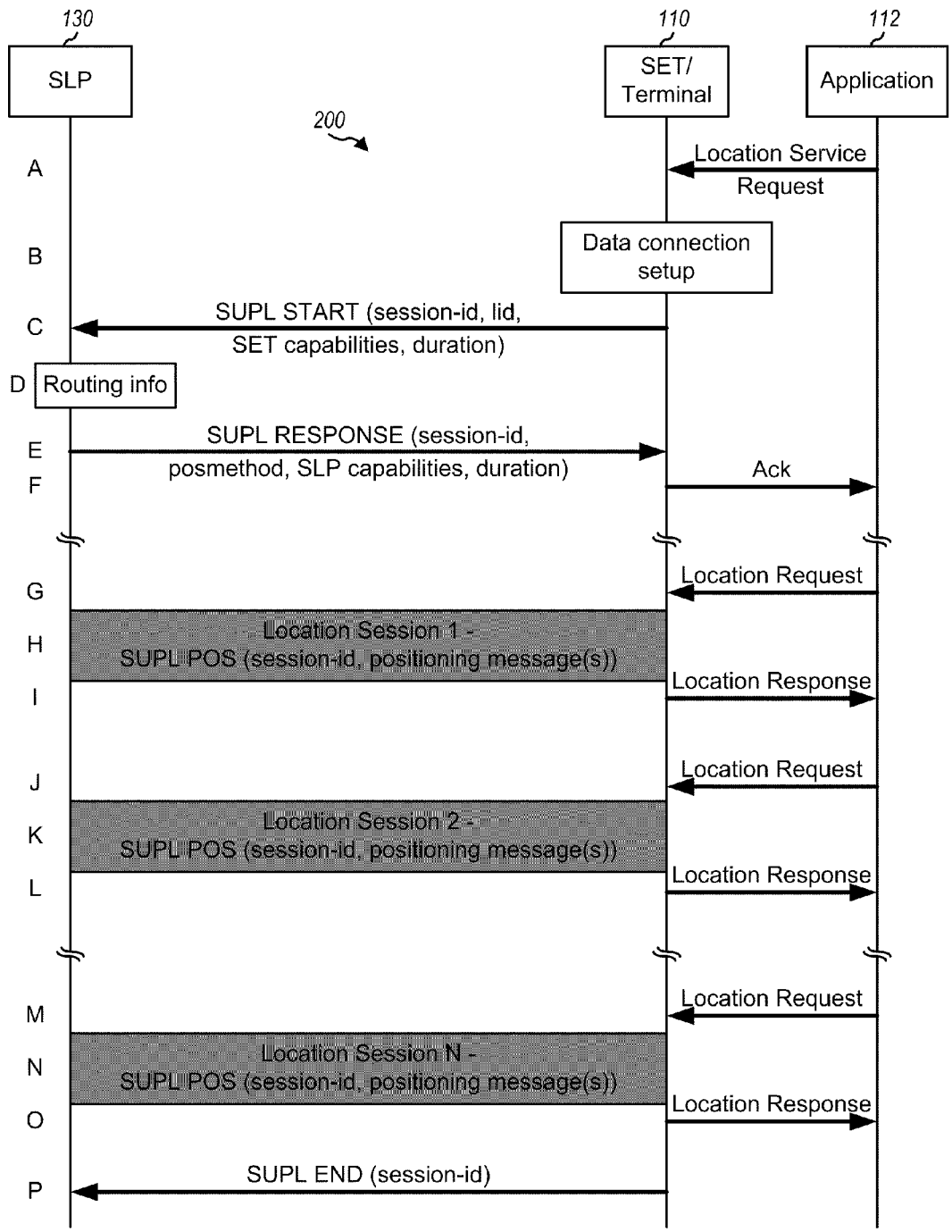
FIG. 2 shows a call flow for a terminal-initiated extended location session.

FIG. 2 shows a design of a call flow 200 for a SET-initiated extended location session with the streamlined SUPL service layer. An application 112 running on SET 110 may desire location information (e.g., a location estimate) for SET 110 and may send a location service request to the SUPL service layer in SET 110 (step A). For simplicity, the SUPL service layer and the SUPL positioning layer in SET 110 will be referred to as simply SET 110 in the description below, except when being distinguished from other parts of SET 110. SET 110 may perform a data connection setup procedure, attach itself to a packet data network if necessary, and establish a secure IP connection to SLP 130 (step B). SLP 130 may be A-SLP 130a in serving network 102a, or H-SLP 130b in home network 102b, or some other SLP.

SET 110 may then send a SUPL START message to establish an extended location session with SLP 130 (step C). This message may include a session-id used to identify the extended location session, a location-id (lid) identifying a current serving cell of SET 110, the capabilities of SET 110 (SET capabilities), a requested duration for the extended location session (duration), etc. The SET capabilities may include positioning capabilities and/or service capabilities of SET 110. The positioning capabilities may include positioning methods and positioning protocols supported by SET 110. The service capabilities may include location services, reporting capabilities, and/or other capabilities supported by SET 110. For the extended location session, the SET capabilities may be limited to options applicable for the streamlined SUPL service layer. The requested duration may be selected by SET 110 and may be an expected duration in which location service may be desired or needed by SET 110. The requested duration may be selected with or without inputs from application 112.

SLP 130 may receive the SUPL START message from SET 110 and may recognize that this message is for an extended location session (instead of a normal location session) based on the requested duration and/or some other information in the message. SLP 130 may extract and store the SET capabilities for future use. SLP 130 may authenticate and authorize SET 110 for the extended location session and may obtain routing information for SET 110 (step D). SLP 130 may then send a SUPL RESPONSE message to SET 110 (step E). This message may include the session-id included in the SUPL START message, a selected positioning method (posmethod), the capabilities of SLP 130 (SLP capabilities), a granted duration for the extended location session (duration), etc. The SLP capabilities may include positioning capabilities (e.g., supported positioning methods and protocols) and/or service capabilities of SLP 130. For the extended location session, the SLP capabilities may be limited to options applicable for the streamlined SUPL service layer. The granted duration may be the maximum lifetime of the extended location session and may be equal to, shorter than, or longer than the requested duration. The extended location session may terminate when the granted duration expires. The extended location session may also be (i) terminated earlier than the granted duration by either SET 110 or SLP 130 sending a SUPL END message or (ii) extended past the granted duration by SET 110 sending another SUPL START message to SLP 130. SET 110 may return an acknowledgement (Ack) to application 112 to indicate availability of location service (step F).

As shown in FIG. 2, the extended location session may be established by a simple exchange of two SUPL messages between SET 110 and SLP 130. The first SUPL message from SET 110 may include information (e.g., the requested duration) to convey a request to establish an extended location session. The first SUPL message may also include one or more parameters (e.g., for SET capabilities) that may be used for the extended location session. The second SUPL message from SLP 130 may include information (e.g., the granted duration) to acknowledge establishment of the extended location session. The second SUPL message may also include one or more parameters (e.g., for SLP capabilities) that may be used for the extended location session. Additional SUPL messages may also be exchanged to negotiate certain parameters (e.g., for duration, positioning method, etc.) and/or to configure additional parameters.

The extended location session may be established by SET 110 in response to a location service request from application 112, as shown in FIG. 2. The extended location session may also be established by SET 110 prior to receiving a location service request from any application, so that the extended location session is available for use if and when location service is requested by any application. In any case, once the extended location session is established, application 112 may obtain location service at any time during the extended location session. Application 112 may send a location request whenever location information (e.g., a location estimate) for SET 110 is desired (steps G, J and M). SET 110 and SLP 130 may then exchange messages for a location session to obtain the requested location information (steps H, K and N). Alternatively, SET 110 may provide the requested location information without interacting with SLP 130 if SET 130 already has the necessary information (e.g., assistance data) from a previous interaction with SLP 130. For example, SET 110 and SLP 130 may perform step H, and step K may be omitted if assistance data is provided by SLP 130 to SET 110 in step H and is sufficient to enable SET 110 to obtain location information (e.g., a location estimate) requested by application 112 in step J. SET 110 may return a location response with the requested location information to application 112 (steps I, L and O). Each location session may include less signaling and processing overhead due to the secure data connection setup in step B, the pre-configuration of the extended location session in steps C and E and, in some cases, assistance data derived from previous location sessions (e.g., such as when assistance data needed for step K is obtained from step H).

The extended location session may terminate when its duration expires. SET 110 may also send a SUPL END message to terminate the extended location session early, e.g., due to a location service termination indication received from application 112 (step P). SLP 130 may also send a SUPL END message to terminate the extended location session (not shown in FIG. 2).

Figure 3:
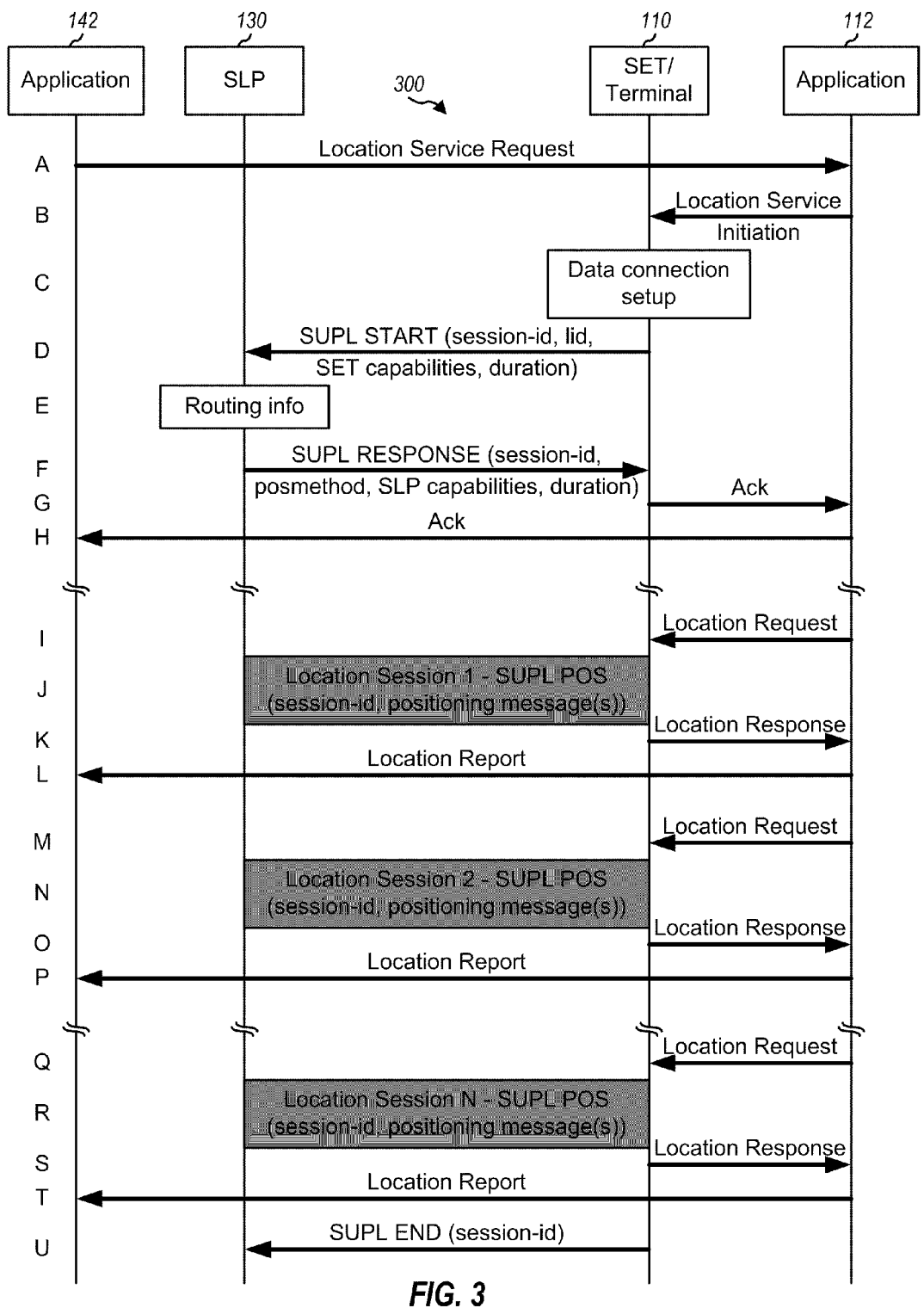
FIG. 3 shows a call flow for a network-initiated extended location session.

FIG. 3 shows a design of a call flow 300 for a network-initiated extended location session with the streamlined SUPL service layer. An application 142 within SUPL agent 140 and external to SET 110 may desire location information (e.g., a location estimate) for SET 110. Application 142 may send a location service request to application 112 on SET 110 (step A). Application 112 may receive the location service request and may send a location service initiation to SET 110 (step B). Steps C, D, E and F may then be performed as described above for steps B, C, D and E, respectively, in FIG. 2 to establish an extended location session for SET 110 with SLP 130. SET 110 may send an acknowledgement to application 112 (step G), which may return a service acknowledgement to application 142 (step H).

Once the extended location session has been established, applications 112 and 142 may obtain location service at any time during the extended location session. Application 112 may send a location request whenever location information (e.g., a location estimate) for SET 110 is desired (steps I, M and Q). SET 110 and SLP 130 may then exchange messages for a location session to obtain the requested location information (steps J, N and R). SET 110 may then provide the requested location information to application 112 (steps K, O and S). Application 112 may then send a location report containing the requested location information to application 142 (steps L, P and T). Each location session may include less signaling and processing overhead due to the secure data connection setup in step C, the pre-configuration of the extended location session in steps D and F and, in some cases, assistance data derived from previous location sessions (e.g., such as when assistance data needed for step N is obtained in step J).

In another exemplary design in FIG. 3, application 112 may perform additional services for application 142 based on the location information obtained from SET 110. For example, application 112 may verify whether SET 110 is within a designated geographic area or has just entered or just left the area. Application 112 may then provide additional information to application 142 in steps L, P and T (e.g., indicate whether SET 110 is inside, has just entered, or has just left the designated geographic area). Alternatively, application 112 may only perform step L, or P, or T if a specific trigger condition is met (e.g., such as SET 110 having just entered or just left a designated geographic area).

The extended location session may terminate when its duration expires. SET 110 may also send a SUPL END message to terminate the extended location session early, e.g., due to a location service termination indication from application 112 or 142 (step U). SLP 130 may also send a SUPL END message to terminate the extended location session (not shown in FIG. 3).

Figure 4:
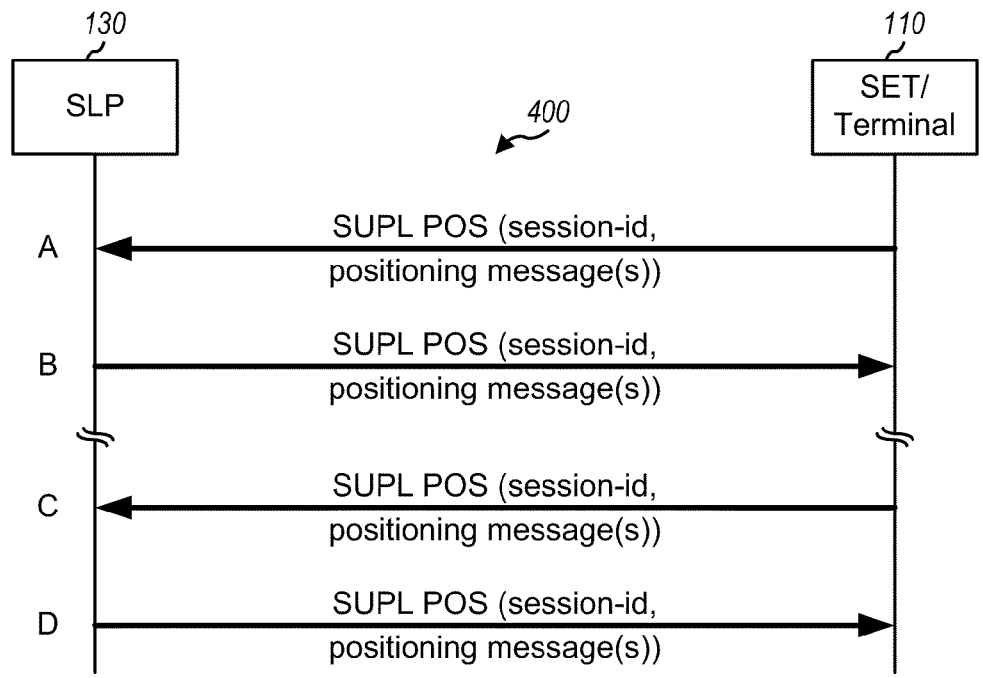
FIGS. 4 and 5 show two call flows for obtaining location service during an extended location session.

FIG. 4 shows a design of a call flow 400 for a location session within an extended location session. Call flow 400 may be used for each of the location sessions shown in FIGS. 2 and 3. SET 110 may send a SUPL POS message to SLP 130 to initiate the location session, e.g., whenever location service is desired by application 112 on SET 110 (step A). This SUPL POS message may include the session-id identifying the extended location session, one or more positioning messages for a selected positioning protocol, QoP defining the required accuracy of a location estimate, an indication of whether velocity is required, and/or other information. The selected positioning protocol may be LPP or IS-801, both of which support SET-initiated positioning. The positioning message(s) may include pertinent information such as a request for assistance data, measurements used for positioning, serving cell ID, other cell IDs, etc.

SLP 130 may receive the SUPL POS message from SET 110 and may send another SUPL POS message to SET 110 (step B). The returned SUPL POS message may include the session-id, one or more positioning messages for the selected positioning protocol, and/or other information. The positioning message(s) may include pertinent information such as assistance data (if requested), a location estimate for SET 110, etc. The location estimate may be sent in a field of a positioning message or a field of the SUPL POS message.

SET 110 and SLP 130 may exchange additional SUPL POS messages (steps C and D). Each SUPL POS message may include the session-id for the extended location session, one or more positioning messages carrying any suitable information, and/or other information. The selected positioning protocol may support one or more positioning methods for one or more access types. Any number of SUPL POS messages may be exchanged between SET 110 and SLP 130 to request and provide information for one or more selected positioning methods. The SUPL POS messages may be used (i) as container messages to carry positioning messages for the selected positioning protocol, (ii) to carry information (e.g., QoP) on the type of location information requested by SET 110, and (iii) to associate the location session with the extended location session.

In one design, SET 110 may send the first SUPL POS message for the location session, and SLP 130 may send the last SUPL POS message. The SUPL POS messages may be sent pair-wise, with one SUPL POS message from SET 110 followed by another SUPL POS message from SLP 130, as shown in FIG. 4. Multiple SUPL POS messages may also be sent by SET 110 or SLP 130 prior to a return SUPL POS message from SLP 130 or SET 110, respectively.

Figure 5:
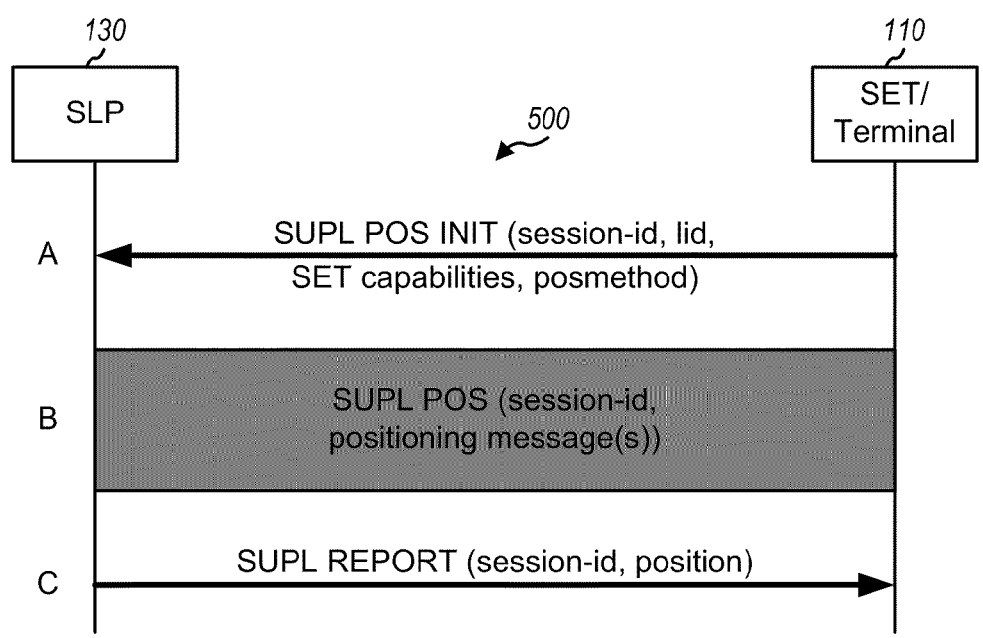

FIG. 5 shows a design of a call flow 500 for a location session within an extended location session. Call flow 500 may also be used for each of the location sessions shown in FIGS. 2 and 3. SET 110 may send a SUPL POS INIT message to SLP 130 to initiate the location session, e.g., whenever location service is desired by application 112 on SET 110 (step A). This SUPL POS INIT message may include the session-id identifying the extended location session, the SET capabilities, a selected positioning method (posmethod) for the location session, cell information (e.g., serving cell ID and/or other cell IDs), QoP, one or more positioning messages for a selected positioning protocol and carrying any suitable information, etc.

SET 110 and SLP 130 may then exchange SUPL POS messages for the location session (step B). Each SUPL POS message may include the session-id for the extended location session, one or more positioning messages for the selected positioning protocol, and/or other information. The selected positioning protocol may be RRLP, RRC, LPP, IS-801, etc. RRLP and RRC support network-initiated positioning whereas LPP and IS-801 support both network-initiated and SET-initiated positioning. Any number of SUPL POS messages may be exchanged between SET 110 and SLP 130 to request and provide information for one or more positioning methods. Upon completing the exchange of SUPL POS messages, SLP 130 may send a SUPL REPORT message containing the session-id and possibly a location estimate and/or velocity estimate for SET 110 (position) (step C). The SUPL REPORT message may be used to indicate the end of the location session and to return any location estimate and/or velocity estimate computed by SLP 130 for SET-assisted positioning.

FIGS. 4 and 5 show two exemplary call flows for a location session within an extended location session. In general, SET 110 may send any suitable SUPL message to initiate a location session with SLP 130. Different SUPL messages may be used for different positioning protocols. For the location session, SET 110 and SLP 130 may exchange any number of SUPL POS messages, which may be used as a container for positioning messages and to associate the location session with the extended location session.

As shown in FIGS. 4 and 5, little signaling and processing overhead may be incurred for each location session within an extended location session. In FIG. 4, SET 110 and SLP 130 may exchange SUPL POS messages for positioning right away, without having to first establish a secure data connection or send any overhead SUPL messages. In FIG. 5, SET 110 may send a SUPL POS INIT message to initiate a location session. The call flows in FIGS. 4 and 5 may avoid other overhead SUPL messages, such as SUPL START and SUPL INIT messages, normally used to initiate a location session.

A pair of SUPL START and SUPL RESPONSE messages may be exchanged between SET 110 and SLP 130 to establish an extended location session, as shown in FIGS. 2 and 3. These SUPL messages may be used to configure one or more parameters (e.g., for a selected positioning method, a selected positioning protocol, QoP, etc.) for the extended location session. The configured parameter(s) may be stored for the extended location session and may be used throughout the extended location session, which may reduce signaling overhead. Each location session within the extended location session may utilize the configured parameter(s).

The techniques described herein may allow SET 110 to have a secure extended location session to allow one or more applications to invoke the SUPL positioning layer at any time to obtain location service. This may improve efficiency, reduce signaling traffic, improve performance, and provide other advantages. The techniques may also allow SET 110 and/or application 112 more control over parameters to use for location service, e.g., to select a positioning method. The techniques may also be used for the proxy mode and the non-proxy mode in SUPL.

The techniques described herein may allow complexity for location services to be moved from SET 110 and SLP 130 to applications (e.g., application 112 running on SET 110). SUPL entities such as SET 110 and SLP 130 may support a small set of simple location services. The applications may implement complex location services by invoking the simple location services and taking over service control from the SUPL entities. For example, an application may determine when to invoke location service during an extended location session to obtain a location estimate for a target SET, evaluate a trigger condition based on the location estimate, and report the location estimate to an LCS client if needed (e.g., when a trigger condition is met). Moving complexity and session control to the applications may allow more location services to be developed for the applications and may also reduce development time for new location services. For example, an application may be able to emulate complex location services such as the periodic trigger location service and the area event trigger location service based on the simple location services supported by the streamlined SUPL service layer.

In another design, complex location services (e.g., for periodic location, triggered location, etc.) may be supported by the SUPL service layer and/or the SUPL positioning layer in SET 110 on behalf of internal application 112 in SET 110 or external application 142. The SUPL service layer and SUPL positioning layer in SET 110 may support the method of FIG. 2 or 3 to establish an extended location session with SLP 130 and obtain location information at periodic time intervals during the extended location session (e.g., by instigating steps H, K and N in FIG. 2 or steps J, N and R in FIG. 3). However, application 112 may not request location information from the SUPL service layer or SUPL positioning layer at intervals (e.g., in steps G, J and M in FIG. 2 or in steps I, M and Q in FIG. 3), and the SUPL service layer and SUPL positioning layer may not provide location information at intervals to application 112 (e.g., in steps I, L and O in FIG. 2 or in steps K, O and S in FIG. 3). Instead, application 112 may indicate the required complex location service (such as determining when SET 110 has just entered, just left or still remains in some designated geographic area) only once to the SUPL service layer (e.g., in step A in FIG. 2 or step B in FIG. 3). The SUPL service layer and/or the SUPL positioning layer may then determine when to obtain location information to support the requested complex location service. When a particular trigger condition is met, the SUPL service layer or the SUPL positioning layer may send an indication of the trigger condition (e.g., such as SET 110 entering or leaving a designated geographic area) to application 112 along with associated location information. If application 112 is acting on behalf of application 142, then application 112 may transfer the location information to application 142. In this design, service complexity may be hidden from SLP 130 and from applications 112 and 142, and may impact only the SUPL layers in SET 110. Furthermore, the additional complex location services supported by the SUPL layers in SET 110 may or may not be defined as part of SUPL. Thus, these additional complex location services may be provided as either proprietary non-standardized location services or as standardized location services in SET 110 to internal applications in SET 110 (e.g., application 112) or external applications (e.g., application 142).

SET 110 typically communicates with H-SLP 130b in home network 102b for a SUPL location session. SET 110 may be preconfigured with the address of H-SLP 130b and may be able to reach H-SLP 130b using the preconfigured H-SLP address. If SET 110 is roaming, then SET 110 may exchange SUPL messages with H-SLP 130b via various network entities in serving network 102a and home network 102b.

In another aspect, SET 110 may communicate with A-SLP 130*a* in serving network 102*a* (instead of H-SLP 130*b* in home network 102*b*) for an extended location session. This may reduce signaling traffic and may also reduce delay to obtain location service during the extended location session when SET 110 is roaming This may also assist a SET that does not have an H-SLP or when an A-SLP provides some services that an H-SLP does not provide (e.g., more accurate and more reliable location support, or support of an access network not supported by an H-SLP).

SET 110 may discover A-SLP 130*a* in serving network 102*a* in various manners. In one design, SET 110 may obtain the address of A-SLP 130*a* using Dynamic Host Configuration Protocol (DHCP). SET 110 may broadcast a request for configuration information for an A-SLP for an access network currently serving SET 110. A DHCP server may receive the request from SET 110 and may respond with configuration information (e.g., an address) for A-SLP 130*a* from a configuration database maintained by the DHCP server. In another design, SET 110 may obtain the address of A-SLP 130*a* using Domain Name System (DNS). SET 110 may send a DNS query with an A-SLP domain name (e.g., aslp.networkABC.com) derived from the domain name of an access network (e.g., networkABC.com) currently serving SET 110. A DNS server may receive the DNS query from SET 110 and may respond with an address associated with the domain name. In yet another design, A-SLP 130*a* may be assigned a fixed and well-known address. SET 110 may know the fixed address of A-SLP 130*a* and may be able to directly access A-SLP 130*a*. In yet another design, an access network may provide the address of an associated A-SLP to SET 110 when SET 110 first attaches to the access network or when SET 110 sends a request for this address to the access network.

In one design, either A-SLP 130*a* or H-SLP 130*b* may be selected to serve SET 110 based on various factors such as services and positioning capabilities (of either A-SLP 130*a* or H-SLP 130*b*), billing charges, speed and ease of access (e.g., signaling bandwidth and delay), etc. As an example, a 3GPP H-SLP may not be able to support positioning of a SET accessing a 3GPP2 network (or vice versa), which may make the use of an A-SLP essential. A-SLP 130*a* may support both the streamlined SUPL service layer and normal/full SUPL service layer (e.g., as described in SUPL 2.0). Security including mutual authentication and ciphering may be used for communication between SET 110 and A-SLP 130*a*. Security for the streamlined SUPL service layer may be achieved (i) in similar manner as for communication between SET 110 and H-SLP 130*b* for the full SUPL service layer or (ii) using different procedures, e.g., different authentication methods.

In yet another aspect, all or a portion of SUPL may be implemented using Extensible Markup Language (XML). For example, the portion of SUPL related to the streamlined SUPL service layer may be implemented with XML. In one design, ASN.1 (Abstract Syntax Notation One) may be retained as a schema for SUPL, and International Telecommunication Union (ITU) X.693 may be employed to encode this in XML (e.g., with XER encoding). In another design, new Document Type Definition (DTD) schema or XML Schema Definition (XSD) schema may be defined from the SUPL ASN.1 definition but may be restricted to SUPL messages and parameters applicable to the streamlined SUPL service layer. In both designs, only a subset of SUPL may be impacted by implementation in XML, and the impact may be limited to front-end coders and parsers. Negotiating between ASN.1 and XML may be avoided by defining either ASN.1 or XML by convention for any A-SLP and may be configured on a Subscriber Identity Module (SIM) card of a SET for an H-SLP.

Other positioning protocols such as RRLP, RRC, LPP, and IS-801 may also be converted from ASN.1 (or some other format) to XML. The conversion may be syntactic rather than semantic (i.e., with changes in format rather than content). An XML version of a given positioning protocol (which may be referred to as an XML positioning protocol) may support the same assistance data and measurement types as an ASN.1 version of the positioning protocol. New positioning methods as well as changes to existing positioning methods may be added to the resulting XML positioning protocol. For example, the XML positioning protocol may be extended to support positioning for non-3GPP and non-3GPP2 access types such as Wi-Fi, fixed broadband, WiMAX, etc.

Figures 6, 7:
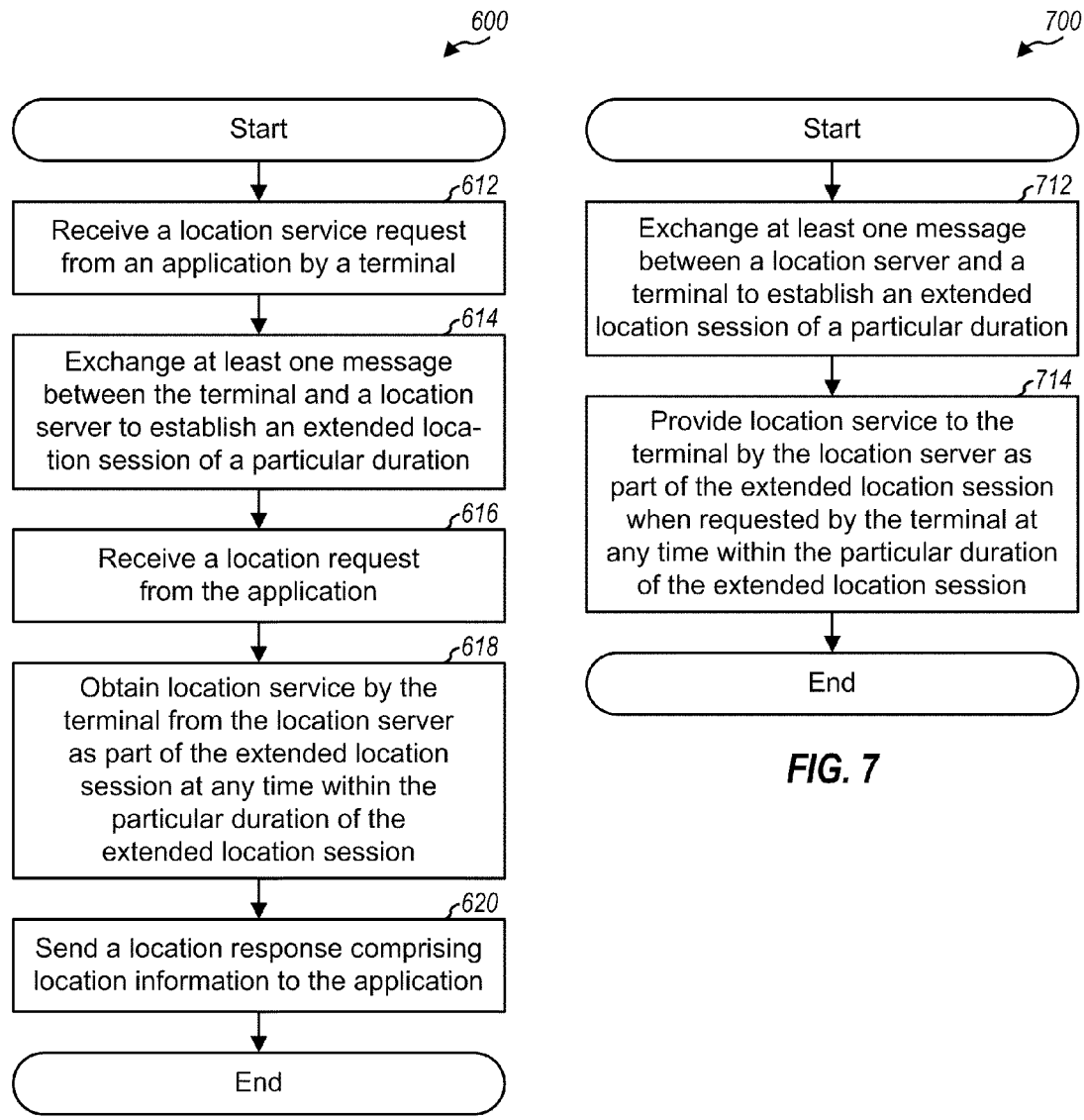
FIG. 6 shows a process performed by a terminal to obtain location service.
FIG. 7 shows a process performed by a location server to support location service.

FIG. 6 shows a design of a process 600 performed by a terminal/SET to obtain location service. The terminal may receive a location service request from an application, which may be internal to the terminal (e.g., as shown in FIG. 2) or external to the terminal (e.g., as shown in FIG. 3) (block 612). The terminal may exchange at least one message with a location server to establish an extended location session of a particular duration (block 614). The terminal may establish the extended location session (i) in response to the location service request from the application or (ii) prior to receiving any location service request.

The terminal may receive a location request from the application (block 616). The terminal may obtain location service from the location server as part of the extended location session at any time within the particular duration of the extended location session, e.g., in response to receiving the location request (block 618). The terminal may send a location response comprising location information to the application (block 620).

In one design, the terminal and the location server may exchange SUPL messages for the extended location session. The terminal may determine a session ID for the extended location session. The terminal may use the session ID to identify messages exchanged with the location server to obtain location service during the extended location session.

In one design of block 614, the terminal may exchange the at least one message with the location server to further configure at least one parameter for the extended location session. The at least one configured parameter may comprise a selected positioning method, or a selected positioning protocol, or QoP, or some other parameter, or a combination thereof. The terminal may thereafter obtain location service from the location server based on the at least one configured parameter.

In one design of block 614, the terminal may send a first message (e.g., a SUPL START message) to the location server to initiate establishment of the extended location session. The terminal may receive a second message (e.g., a SUPL RESPONSE message) sent by the location server to acknowledge establishment of the extended location session. In one design, the first message may comprise a requested duration of the extended location session, and the second message may comprise a granted duration of the extended location session. The particular duration of the extended location session may be equal to the granted duration or may be determined in other manners. In one design, the first message may comprise positioning capabilities of the terminal, and the second message may comprise positioning capabilities of the location server. The first and second messages may also comprise other information.

In one design of block 618, the terminal may send a third message (e.g., a SUPL POS message or a SUPL POS NIT message) to the location server to obtain location service. The terminal may receive a fourth message (e.g., a SUPL POS message or a SUPL REPORT message) comprising location information from the location server. In one design, the third message may comprise a request for assistance data, and the location information in the fourth message may comprise assistance data for the terminal In another design, the third message may comprise measurements, and the location information may comprise a location estimate for the terminal In one design, the third message may comprise a positioning method selected by the terminal, or at least one positioning message for the selected positioning method, or some other information, or a combination thereof.

In one design, the terminal may obtain location service a plurality of times during the extended location session. The terminal may receive location information (e.g., a location estimate for the terminal) each time location service is obtained. The terminal (or the application at the terminal) may use the location information to emulate a periodic trigger location service, or an area event trigger location service, or some other location service more complex than an immediate location service. In general, the terminal may obtain location service any number of times and at any time during the extended location session. The terminal may emulate any location service based on the location information received from all of the times in which location service is obtained by the terminal.

The extended location session may terminate when the particular duration expires. In one design, the location server may send a SUPL END message to the terminal (or vice versa) when the duration has expired to explicitly terminate the extended session. In another design, the terminal may exchange a message with the location server to terminate the extended location session prior to expiration of the particular duration, e.g., as shown in FIGS. 2 and 3. In yet another design, the terminal may send a message to the location server to request for extension of the extended location session past the particular duration.

In one design, the terminal may communicate with a home network, and the location server may be an H-SLP (or some other location server) residing in the home network. In another design, the terminal may be roaming away from the home network and may communicate with a serving network. In this case, the location server may be an A-SLP in the serving network or the H-SLP in the home network. The terminal may discover the A-SLP using DHCP, or DNS, or when attaching to the serving network, or using some other mechanism.

FIG. 7 shows a design of a process 700 performed by a location server (e.g., an SLP) to support location service. The location server may exchange at least one message with a terminal to establish an extended location session of a particular duration (block 712). The location server may provide location service to the terminal as part of the extended location session when requested by the terminal at any time within the particular duration of the extended location session (block 714).

In one design of block 712, the location server may receive a first message sent by the terminal to initiate establishment of the extended location session. The location server may send a second message to the terminal to acknowledge establishment of the extended location session. In one design, the first message may comprise a requested duration of the extended location session, the capabilities of the terminal, etc. The second message may comprise a granted duration of the extended location session, the capabilities of the location server, etc. The message exchange may also configure at least one parameter for the extended location session, e.g., a selected positioning method, a selected positioning protocol, QoP, etc. The location server may provide location service to the terminal based on the at least one configured parameter.

In one design of block 714, the location server may receive a third message sent by the terminal to obtain location service. The location server may send a fourth message comprising location information to the terminal. The third message may comprise a request for assistance data, measurements, a selected positioning method, etc. The fourth message may comprise assistance data for the terminal, a location estimate for the terminal, and/or some other location information. The location server may provide location service to the terminal a plurality of times during the extended location session to enable the terminal to repeatedly obtain location information or emulate a periodic trigger location service, or an area event trigger location service, or some other complex location service.

The extended location session may terminate when the particular duration expires. In one design, the location server may send a SUPL END message to the terminal (or vice versa) when the duration has expired to explicitly terminate the extended session. In another design, location server may exchange a message with the terminal to terminate the extended location session prior to expiration of the particular duration, e.g., as shown in FIG. 2 or 3. In yet another design, the location server may receive a message sent by the terminal to request for extension of the extended location session past the particular duration. The location server may either (i) grant the request and extend the extended location session or (ii) dismiss the request and terminate the extended location session when the particular duration expires.

Figure 8:
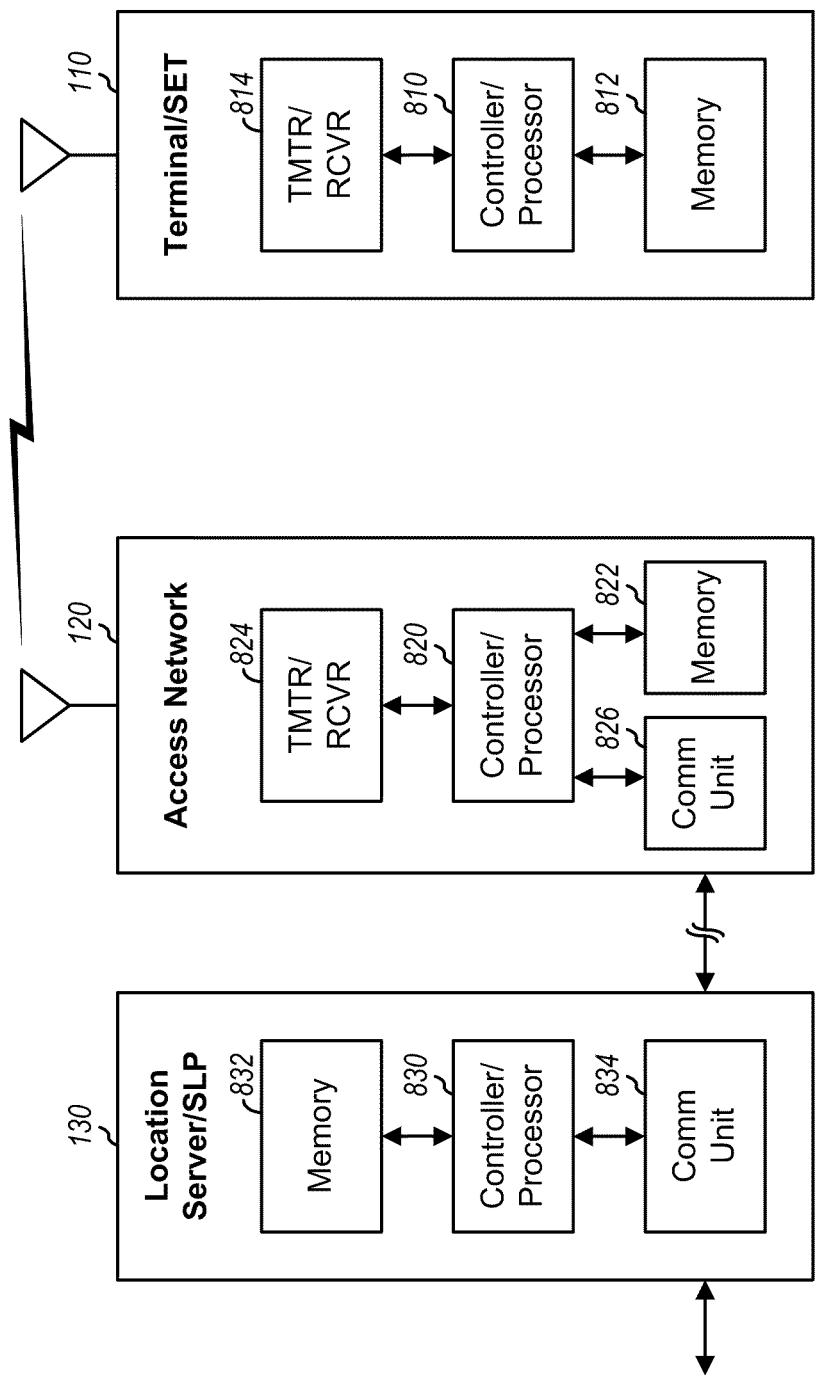
FIG. 8 shows a block diagram of a terminal, an access network, and a location server.

FIG. 8 shows a block diagram of a design of terminal/SET 110, access network 120, and location server/SLP 130. For simplicity, FIG. 8 shows only one controller/processor 810, one memory 812, and one transmitter/receiver (TMTR/RCVR) 814 for terminal 110, only one controller/processor 820, one memory 822, one transmitter/receiver 824, and one communication (Comm) unit 826 for access network 120, and only one controller/processor 830, one memory 832, and one communication unit 834 for SLP 130. In general, each entity may include any number of processing units (e.g., processors, controllers, etc.), memories, transmitters/receivers, communication units, etc. Terminal 110 may support communication with one or more wireless and/or wireline networks. Terminal 110 may also receive and process signals from one or more SPS's, e.g., GPS, Galileo, GLONASS, etc.

On the downlink, access network 120 may transmit traffic data, signaling, and pilot to terminals within its coverage area. These various types of information may be processed by processor 820, conditioned by transmitter 824, and transmitted on the downlink. At terminal 110, downlink signals from access network 120 may be received and conditioned by receiver 814 and further processed by processor 810 to obtain various types of information. Processor 810 may perform process 600 in FIG. 6 and/or other processes for the techniques described herein. Processor 810 may also perform processing for SET 110 in FIGS. 2 through 5. Memories 812 and 822 may store program codes and data for terminal 110 and access network 120, respectively. On the uplink, terminal 110 may transmit traffic data, signaling, and pilot to access network 120. These various types of information may be processed by processor 810, conditioned by transmitter 814, and transmitted on the uplink. At access network 120, the uplink signals from terminal 110 and other terminals may be received and conditioned by receiver 824 and further processed by processor 820 to obtain various types of information from the terminals. Access network 120 may directly or indirectly communicate with SLP 130 via communication unit 826.

Within SLP 130, processor 830 may perform processing to support location services for terminals. For example, processor 830 may perform process 700 in FIG. 7 and/or other processes for the techniques described herein. Processor 830 may also perform processing for SLP 130 in FIGS. 2 through 5. Processor 830 may also provide assistance data to terminal 110, compute location estimates for terminal 110, provide location information to SUPL agent 140, etc. Memory 832 may store program codes and data for SLP 130. Communication unit 834 may allow SLP 130 to communicate with access network 120, terminal 110, and/or other network entities (not shown in FIG. 8). SLP 130 and terminal 110 may exchange messages (e.g., SUPL messages), and these messages may be transported via access network 120.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as hardware, computer software/firmware, or combinations of both. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. The techniques may also be implemented in conjunction with femtocells.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system (s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

A terminal/SET refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. Terminal/SET is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, terminal/SET is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered terminal/SET.

The methodologies described herein may be implemented by various means depending upon the application. For example, these methodologies may be implemented in hardware, firmware, software, or any combination thereof For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of obtaining location service, comprising:
   sending a first message from a terminal to a location server to initiate establishment of an extended location session of a particular duration, the first message comprising positioning capabilities of the terminal;
   receiving a second message sent by the location server to the terminal to acknowledge establishment of the extended location session, the second message comprising positioning capabilities of the location server; and
   obtaining location service by the terminal a plurality of times from the location server as part of the extended location session at any time within the particular duration of the extended location session.

2. The method of claim 1, further comprising: exchanging at least one message between the terminal and the location server to further configure at least one parameter for the extended location session, and wherein the obtaining location service comprises obtaining location service from the location server based on the at least one configured parameter.

3. The method of claim 2, wherein the at least one configured parameter comprises a selected positioning method, or a selected positioning protocol, or Quality of Positioning (QoP), or a combination thereof.

4. The method of claim 1, wherein the first message comprises a requested duration for the extended location session, wherein the second message comprises a granted duration for the extended location session, and wherein the particular Duration of the extended location session is equal to the granted duration.

5. The method of claim 1, wherein the first message comprises positioning capabilities of the terminal, and wherein the second message comprises positioning capabilities of the location server.

6. The method of claim 1, further comprising:
   receiving a location service request from an application at the terminal, and wherein the extended location session is established by the terminal in response to the location service request.

7. The method of claim 1, further comprising:
   receiving a location service request from an application external to the terminal, and wherein the extended location session is established by the terminal in response to the location service request.

8. The method of claim 1, further comprising:
   receiving a location request from an application at the terminal, and wherein location service is obtained by the terminal in response to the location request.

9. The method of claim 1, wherein the obtaining location service comprises
   sending a third message from the terminal to the location server to obtain location service, and
   receiving a fourth message comprising location information from the location server.

10. The method of claim 9, wherein the third message comprises a request for assistance data, and wherein the location information in the fourth message comprises assistance data for the terminal.

11. The method of claim 9, wherein the third message comprises measurements, and wherein the location information in the fourth message comprises a location estimate for the terminal.

12. The method of claim 9, wherein the third message comprises a positioning method selected by the terminal.

13. The method of claim 9, wherein the third message comprises at least one positioning message for a selected positioning protocol.

14. The method of claim 1, further comprising:
  determining a session identifier (ID) for the extended location session; and
  using the session ID to identify messages exchanged between the terminal and the location server to obtain location service during the extended location session.

15. The method of claim 1, wherein the obtaining location service comprises
  obtaining location service by the terminal a plurality of times during the extended location session, and
  using location information, received by the terminal from the plurality of times of obtaining location service, to emulate a periodic trigger location service or an area event trigger location service.

16. The method of claim 1, further comprising:
  exchanging a message between the terminal and the location server to terminate the extended location session prior to expiration of the particular duration.

17. The method of claim 1, further comprising:
  sending a message from the terminal to the location server to request for extension of the extended location session past the particular duration.

18. The method of claim 1, wherein the terminal is roaming away from a home network and communicates with a serving network, and wherein the location server is associated with the serving network.

19. The method of claim 1, wherein the terminal and the location server exchange Secure User Plane Location (SUPL) messages for the extended location session.

20. An apparatus for obtaining location service, comprising:
  means for sending a first message from a terminal to a location server to initiate establishment of an extended location session of a particular duration, the first message comprising positioning capabilities of the terminal;
  means for receiving a second message sent by the location server to the terminal to acknowledge establishment of the extended location session, the second message comprising positioning capabilities of the location server; and
  means for obtaining location service by the terminal a plurality of times from the location server as part of the extended location session at any time within the particular duration of the extended location session.

21. The apparatus of claim 20, further comprising: means for exchanging at least one message between the terminal and the location server to further configure at least one parameter for the extended location session, and wherein the means for obtaining location service comprises means for obtaining location service from the location server based on the at least one configured parameter.

22. The apparatus of claim 20, wherein the means for obtaining location service comprises
  means for sending a third message from the terminal to the location server to obtain location service, and
  means for receiving a fourth message comprising location information from the location server.

23. The apparatus of claim 20, wherein the means for obtaining location service comprises
  means for obtaining location service by the terminal a plurality of times during the extended location session, and
  means for using location information, received by the terminal from the plurality of times of obtaining location service, to emulate a periodic trigger location service or an area event trigger location service.

24. An apparatus for wireless communication, comprising:
  at least one processing unit configured to send a first message from a terminal to a location server to initiate establishment of an extended location session of a particular duration, and to receive a second message sent by the location server to the terminal to acknowledge establishment of the extended location session, the first message comprising positioning capabilities of the terminal, and the second message comprising positioning capabilities of the location server, and to obtain location service by the terminal a plurality of times from the location server as part of the extended location session at any time within the particular duration of the extended location session.

25. The apparatus of claim 24, wherein the at least one processing unit is configured to exchange at least one message between the terminal and the location server to further configure at least one parameter for the extended location session, and to obtain location service from the location server based on the at least one configured parameter.

26. The apparatus of claim 24, wherein the at least one processing unit is configured to send a third message from the terminal to the location server to obtain location service, and to receive a fourth message comprising location information from the location server.

27. The apparatus of claim 24, wherein the at least one processing unit is configured to obtain location service by the terminal a plurality of times during the extended location session, and to use location information, received by the terminal from the plurality of times of obtaining location service, to emulate a periodic trigger location service or an area event trigger location service.

28. A computer program product, comprising:
  a non-transitory computer-readable medium comprising:
    code to cause the at least one processing unit to receive at a location server a first message from the terminal to initiate establishment of an extended location session of a particular duration, the first message comprising positioning capabilities of the terminal,
    code to cause the at least one processing unit to send a second message from the location server to the terminal to acknowledge establishment of the extended location session, the second message comprising positioning capabilities of the location server, and
    code to cause the at least one processing unit to obtain location service by the terminal a plurality of times from the location server as part of the extended location session at any time within the particular duration of the extended location session.

29. A method of supporting location service, comprising:
  receiving a first message sent by a terminal to a location server to initiate establishment of an extended location session of a particular duration, the first message comprising positioning capabilities of the terminal;
  sending a second message from the location server to the terminal to acknowledge establishment of the extended location session, the second message comprising positioning capabilities of the location server; and
  providing location service to the terminal a plurality of times by the location server as part of the extended location session when requested by the terminal at any time within the particular duration of the extended location session.

30. The method of claim 29, further comprising: exchanging at least one message between the terminal and the location server to further configure at least one parameter for the extended location session, and wherein the providing location service comprises providing location service to the terminal based on the at least one configured parameter.

31. The method of claim 29, wherein the providing location service comprises
receiving a third message sent by the terminal to the location server to obtain location service, and
sending a fourth message comprising location information from the location server to the terminal.

32. The method of claim 29, wherein the providing location service comprises providing location service to the terminal a plurality of times during the extended location session to enable the terminal to emulate a periodic trigger location service or an area event trigger location service.

33. The method of claim 29, further comprising:
exchanging a message between the location server and the terminal to terminate the extended location session prior to expiration of the particular duration.

34. The method of claim 29, further comprising:
receiving a message sent by the terminal to the location server to request for extension of the extended location session past the particular duration.

35. An apparatus for supporting location service, comprising:
means for receiving a first message sent by a terminal to a location server to initiate establishment of an extended location session of a particular duration;
means for sending a second message from the location server to the terminal to acknowledge establishment of the extended location session, the first message comprising positioning capabilities of the terminal, and the second message comprising positioning capabilities of the location server; and
means for providing location service to the terminal a plurality of times by the location server as part of the extended location session when requested by the terminal at any time within the particular duration of the extended location session.

36. The apparatus of claim 35, further comprising: means for exchanging at least one message between the terminal and the location server to further configure at least one parameter for the extended location session, and wherein the means for providing location service comprises means for providing location service to the terminal based on the at least one configured parameter.

37. The apparatus of claim 35, wherein the means for providing location service comprises
means for receiving a third message sent by the terminal to the location server to obtain location service, and
means for sending a fourth message comprising location information from the location server to the terminal.

38. The apparatus of claim 35, wherein the means for providing location service comprises means for providing location service to the terminal a plurality of times during the extended location session to enable the terminal to emulate a periodic trigger location service or an area event trigger location service.

* * * * *